Sept. 16, 1952 W. K. LOCKHART 2,610,998
REMOVABLE MOUNTINGS AND INTERLOCKING MEANS FOR ELECTRICAL DEVICES
Filed July 7, 1948

INVENTOR.
William K. Lockhart.
BY
HIS ATTORNEY

Patented Sept. 16, 1952

2,610,998

UNITED STATES PATENT OFFICE 2,610,998

REMOVABLE MOUNTINGS AND INTERLOCKING MEANS FOR ELECTRICAL DEVICES

William K. Lockhart, Penn Township, Allegheny County, Pa., assignor to Westinghouse Air Brake Company, a corporation of Pennsylvania Application July 7, 1948, Serial No. 37,386

3 Claims. (Cl. 173—328)

The present invention relates to removable mounting means for electrical devices, and particularly to lockable mountings for plug-in relays.

An object of the invention is to provide an improved mounting for an electrical relay which will positively lock the relay against accidental removal, but which will permit ready removal when desired.

Another object is to provide an improved compact locking arrangement for a mounting of the type described, requiring a minimum of frontal area.

I accomplish these objects by providing on the relay base a projecting stud with a narrow shank and a larger head portion. The support on which the relay is mounted is provided with a recess to receive the stud. A locking plate is mounted on the support for transverse movement with respect to the recess. This plate has a slot wide enough to receive the shank portion of the stud but not the head portion. The locking plate may be moved between an unlocking position where it does not obstruct movement of the stud in or out of the recess and a locking position where it engages the shank of the stud and prevents the withdrawal of the head from the recess.

Two forms of locking plate structure are shown. In one arrangement, the locking plate is pivoted and is provided with an arcuate open-ended slot. In the other arrangement, the locking plate is slidable longitudinally, and has a keyhole slot. In the latter arrangement, the locking plate is biased by gravity to its locking position. The locking in the locking plate and the head of the stud are provided with cooperating beveled edge portions which are effective to move the plate to its unlocking position during insertion of the stud into the recess. The movement of the plate is guided by means of screws extending through guiding slots, and locking nuts are provided on these guiding screws for positively locking the plate in its locking position.

Other objects and characteristic features of the invention will become apparent as the description proceeds.

I shall describe three forms of relay mounting structures embodying my invention, and shall then point out the novel features thereof in claims.

Figure 1:
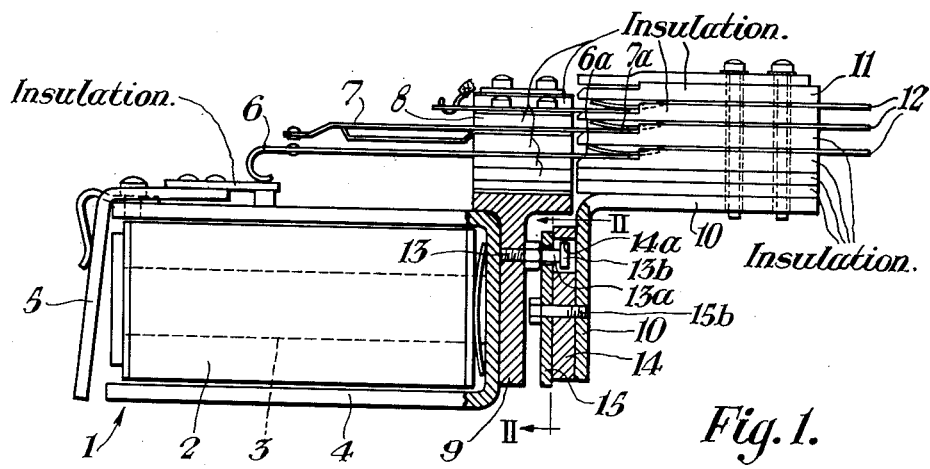
Figure 2:
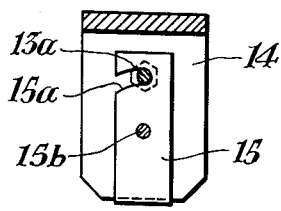
Figure 3:
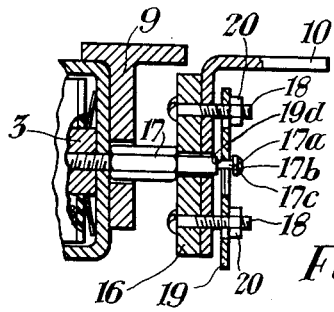
Figure 4:
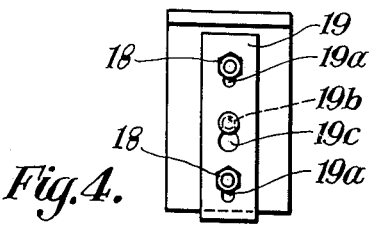
Figure 5:
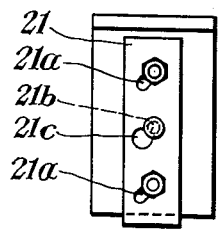

In the accompanying drawings, Fig. 1 is an elevational view, partly in section, of an electric relay and a mounting therefor, embodying my invention. Fig. 2 is a sectional view taken along the line II—II of Fig. 1, looking in the direction of the arrows. Fig. 3 is a fragmentary sectional view, similar to a portion of Fig. 1, illustrating a relay mounting embodying a modified form of my invention. Fig. 4 is a right-hand elevational view of the relay mounting of Fig. 3. Fig. 5 is a view similar to Fig. 4, illustrating a further modification.

Referring now to Fig. 1, there is shown a relay 1 of generally conventional construction, including a winding 2 mounted on a core 3. The relay 1 includes a yoke 4 and an armature 5 which operates a movable contact finger 6. The movable contact finger 6 cooperates with a stationary contact finger 7. All the contact fingers are arranged in a stack 8 in a well-known manner, and the stack is mounted on a base 9. The base 9 also supports the core 3 and the yoke 4.

The contact fingers 6 and 7 are elongated and project beyond the stack 8 to form contact plugs 6a and 7a.

The relay is adapted for mounting on a support which takes the form of an angle bracket 10. The bracket 10 supports a stack 11 of spring contact fingers 12 interspersed by insulating plates in a well-known manner. The spring fingers 12 and the insulating plates of stack 11 cooperate to form jacks for receiving the plugs 6a and 7a when the relay 1 is mounted in place on the supporting bracket 10.

A stud 13 projects from the back of the base 9, and is provided with a relatively narrow shank portion 13a and a wider head portion 13b. A fixed plate 14 and a rotatable locking plate 15 are attached to the mounting bracket 10. The plate 14 is provided with a recess 14a to receive the head 13b of stud 13. The locking plate 15 is pivotally attached to the bracket 10 by means of a mounting screw 15b. The locking plate 15 is provided with an arcuate slot 15a which is wide enough to receive the shank portion 13a of the stud 13, but is not wide enough to receive the head portion 13b.

The locking plate 15 projects downwardly beyond the lower edges of the bracket 10 and the relay 1, so that it can be readily rotated by hand between the locking position shown in Fig. 2 and an unlocking position.

When it is desired to mount the relay 1 on the bracket 10, the locking plate 15 is first rotated to the unlocking position, where it does not obstruct the passage of the stud head 13b into the recess 14a. The relay is then moved into place on the bracket 10, with the plugs 6a and 7a engaging their respective jacks. After the stud head 13b has entered the recess 14a, the locking plate 15 is rotated to the locking position shown in Fig. 2. The sides of the slot 15a then engage the shank 13a of the stud as shown in Fig. 2, and prevent removal of head 13b from the recess 14a. The relay 1 is thereby effectively locked to the supporting bracket 10.

It should be observed that the locking apparatus is so arranged that the relay cannot be accidently removed or dislodged, but on the other hand is readily removable by rotation of the locking plate 15. It should also be noted that the locking mechanism takes up no additional frontal area on the bracket 10 than that required by the relay itself. This locking arrangement therefore readily lends itself to applications where a plurality of relays is required to be mounted on a single supporting bracket.

Referring now to Figs. 3 and 4, there is shown a modified form of lockable mounting apparatus embodying my invention. The mounting bracket 10 of Fig. 3 is provided with a fixed plate 16 generally corresponding to the fixed plate 14 of Fig. 1. The relay base 9 has a stud 17 generally corresponding to the stud 13 of Fig. 1. However, the stud 17 is considerably longer than the stud 13 of Fig. 1. Stud 17 is provided with a narrow shank portion 17a and an enlarged head 17b. Bracket 10 and fixed plate 16 are provided with aligned apertures to receive the stud 17 when the relay is mounted on the bracket 10. The stud 17 projects completely through these apertures, with the narrow shank 17a and the head 17b projecting beyond the back of the bracket 10, as shown in Fig. 3.

Plate 16 is attached to the bracket 10 by means of mounting screws 18. In back of the bracket 10, the mounting screws 18 support a locking plate 19. The plate 19 is provided with slots 19a which receive the mounting screws 18. The plate 19 also has a keyhole slot including a narrow portion 19b wide enough to receive the shank 17a of stud 17 and a wide portion 19c, which is wide enough to receive the head 17b of stud 17.

The wide portion 19c of the keyhole slot is lower than the narrow portion 19b. The plate 19 is biased by gravity to its lowermost position, wherein the narrow portion 19b is aligned with the stud 17. The plate 19 may be lifted by manually pushing upward against its bottom edge to bring the wide portion 19c into alignment with the stud 17. In this position of the locking plate 19, the stud 17 can pass freely in and out of the apertures in bracket 10 and plate 16. When the relay is placed in position on the bracket 10, and the locking plate 19 is released, it drops to its locking position, the narrow portion 19b of the keyhole slot moving behind the head 17b of the stud so that the stud and the relay cannot be withdrawn from the bracket 10. Nuts 20 are provided on mounting screws 18 for purposes to be hereinafter described.

The keyhole slot is provided with a beveled edge at 19d, and the head 17b of stud 17 is provided with an oppositely beveled edge 17c. When the locking plate 19 is in its locking position, and the stud 17 is inserted through the apertures in bracket 10 and plate 16, the beveled portion 17c of head 17b engages the beveled edge 19d of the slot in plate 19. The horizontal movement of the plate 19 is limited by the nuts 20. After the plate 19 engages nuts 20, it is lifted by a cam action of the beveled edges 19d and 17c to permit free passage of the head 17b through the wide portion 19c of the keyhole slot. As soon as the head 17b has passed completely through the keyhole slot, the plate 19 drops to its locking position, thereby maintaining the relay in place. Suitable means, as for example, cotter pins, may be provided on the screws 18 to prevent movement of the nuts 20 to a point where they would not be properly effective to limit the backward movement of plate 19.

If the nuts 20 are tightened after the relay has been placed in position on the bracket 10, the locking plate cannot be lifted by hand to its unlocking position without first loosening the nuts. The nuts 20 thereby provide means for positively locking the relay to its support.

Fig. 5 shows a modified form of the apparatus of Figs. 3 and 4. In Fig. 5, the locking plate 21 is provided with diagonal slots 21a corresponding to the vertical slots 19a of Fig. 4. Plate 21 is also provided with a diagonal keyhole slot 21b—21c corresponding to the vertical keyhole slot 19b—19c of Fig. 4. The operation of this structure is the same as that of Fig. 4, except that plate 21 moves diagonally instead of vertically.

Although I have herein shown and described only three forms of relay mounting structure embodying my invention, it is understood that various changes and modifications may be made therein within the scope of the appended claims without departing from the spirit and scope of my invention.

Having thus described my invention, what I claim is:

1. In combination, an electrical device including a base member, a plurality of electrical contact plugs mounted on the base member and projecting therefrom, a stationary support member for said device including a plurality of jacks for receiving said plugs, a stud projecting from one of the members and having a shank and an enlarged head, the other member having an aperture to receive the stud when the base member is moved by straight line motion to insert said plugs into said jacks, a locking plate movably mounted on the other member and having a slot wide enough to receive the shank but not wide enough to receive the head, and means for moving the locking plate between a first position wherein the stud may enter the aperture without engaging the plate and a second position wherein the slot engages the shank and prevents withdrawal of the stud from the aperture, said locking plate being effective in its first position to permit mounting of the base member on the support member with the jacks receiving the plugs, and effective in its second position to lock said device in place on said support member.

2. Apparatus for supporting an electric relay comprising a base member for the relay, a plurality of electrical contact plugs mounted on the base member and projecting therefrom, a stationary support member for said base member, a plurality of jacks on said support member for receiving said plugs, a stud projecting from one of the members and having a shank and an enlarged head, the other member having an aperture to receive the stud when the base member is moved by straight line motion to insert said plugs into said jacks, a locking plate pivotally mounted on the other member and having a slot open at one end and wide enough to receive the shank but not wide enough to receive the head, and means for rotating the locking plate between a first position wherein the head of the stud may enter the aperture without engaging the plate and a second position wherein the slot is aligned with the aperture and the sides of the slot engage the shank and prevent withdrawal of the stud from the aperture.

3. Apparatus for supporting an electric relay comprising a base member for the relay, a plurality of electrical contact plugs mounted on the base member and projecting therefrom, a stationary support member for said base member, a plurality of jacks on said support member for receiving said plugs, a stud projecting from one of the members and having a shank and an enlarged head, the other member having an aperture to receive the stud when the base member is moved by straight line motion to insert said plugs into said jacks, a locking plate, means translatably mounting said plate on the other member including a pair of guide screws in said other member and a pair of slots in said plate to receive said screws, said plate also having a keyhole slot including a first portion wide enough to receive the head of the stud and a second portion wide enough to receive the shank portion of the stud but not wide enough to receive the head, means for translating said plate between a first position wherein said first portion of the keyhole slot is aligned with the aperture and a second position wherein the second portion of the keyhold slot is aligned with the aperture, and locking nuts on the guide screws for retaining the plate in its second position.

WILLIAM K. LOCKHART.

REFERENCES CITED

The following references are of record in the file of this patent:

UNITED STATES PATENTS

| Number | Name | Date |
|---|---|---|
| 1,677,734 | Smith | July 17, 1928 |
| 1,694,056 | Calkins | Dec. 4, 1928 |
| 2,127,473 | Sacco | Aug. 16, 1938 |
| 2,149,550 | Richards et al. | Mar. 7, 1939 |
| 2,314,225 | Leece | Mar. 16, 1943 |
| 2,383,909 | Buchanan | Aug. 28, 1945 |
| 2,396,872 | Miller et al. | Mar. 19, 1946 |
| 2,427,297 | Modrey | Sept. 9, 1947 |
| 2,438,371 | Marholz | Mar. 23, 1948 |
| 2,446,232 | Koenig | Aug. 3, 1948 |

FOREIGN PATENTS

| Number | Country | Date |
|---|---|---|
| 367,069 | Germany | Jan. 16, 1923 |